United States Patent Office 3,337,485
Patented Aug. 22, 1967

3,337,485
CHLOROPRENE-METHACRYLIC ACID COPOLYMER ADHESIVES CONTAINING SALICYLIC ACID
Robert Dale Lawrence and David Hartman Geschwind, Wilmington, Del., assignors to E. I. du Pont de Nemours and Company, Wilmington, Del., a corporation of Delaware
No Drawing. Filed Sept. 24, 1965, Ser. No. 490,094
4 Claims. (Cl. 260—27)

ABSTRACT OF THE DISCLOSURE

An adhesive composition based on a chloroprene polymer. A conventional chloroprene/methylacrylic acid polymer adhesive is improved by adding thereto about 2–10 parts of salicylic acid per 100 parts of copolymer. The adhesives are useful in binding together canvas, aluminum, wood and steel products and provide good adhesion at temperatures up to 150° C. The inclusion of salicylic acid in the adhesive permits the incorporation of considerably less expensive magnesia without a loss in quality.

CROSS REFERENCES TO RELATED APPLICATION

This application is a continuation-in-part of copending application Ser. No. 436,944 filed Mar. 3, 1965, and now abandoned.

This invention relates to an improved adhesive composition based on a polymer of chloroprene, and more particularly to the compounding of solvent cement compositions of carboxylic acid-bearing chloroprene polymers to give adhesives showing superior performance.

Chloroprene polymers are well known as the base for solvent adhesives, often in combination with tackifying resins of the phenolic type. The established principles of compounding chloroprene polymers for adhesive use are summarized in Publication Number 60-0 of the Elastomer Chemicals Department of E. I. du Pont de Nemours and Company, Wilmington, Del., U.S.A., under the title "Neoprene Solvent Adhesives."

The current use of chloroprene polymers in solvent adhesive compositions is, however, subject to some serious disadvantages. One of the limitations of adhesive bonds based on chloroprene polymers has been their tendency to lose strength at elevated temperatures. This limitation can be avoided by proper compounding combined with a curing, of vulcanizing process, but this is often impossible or unreasonably expensive to carry out in the manufacture of large or complicated assemblies. The fields of application for uncured chloroprene polymer adhesives have generally been limited in the past to conditions where the ambient temperature does not exceed 60° C. Thus, it has not been possible to employ adhesive bonding in uses such as large assemblies that must operate at higher temperatures.

Another disadvantage in the current use of this type adhesive is that even at lower temperatures practical employment of chloroprene polymer adhesive compositions requires compounding with rather large proportions of the more expensive grades of magnesia. The above mentioned publication, for instance, recommends the use of 4 to 8 parts of magnesia per 100 parts of chloroprene polymer. This required use of expensive magnesia therefore, substantially reduces the economic desirability of chloroprene polymer compositions.

It has unexpectedly been found that if a small proportion of salicylic acid is added to an adhesive composition comprising a chloroprene/methacrylic acid copolymer and other compounding ingredients consisting of a tackifier from the group consisting of phenolic resins and calcium and zinc rosinates, a solvent, an antioxidant, zinc oxide, and optionally magnesium oxide, the resultant adhesive compositon provides bonds that can be used at temperatures as high as 150°. When proper proportions of salicylic acid are present, these outstanding adhesive qualities are retained even when substantially less expensive magnesia is present. The amount of salicylic acid ordinarily required consists of from 2 to 10 parts per 100 parts of the chloroprene/methacrylic acid copolymer.

The adhesive compositions of the present invention are useful in bonding together canvas, aluminum, wood, stainless steel, carbon steel and other similar products.

The chloroprene/methacrylic acid copolymer used in the invention may be prepared as follows: Chloroprene containing from about 0.1% to 5% by weight of dissolved methacrylic acid is emulsified in water through the use of surfactants such as organic sulfonates or organic sulfates. The quantity of methacrylic acid determines the approximate concentration of acid units in the final copolymer. A modifying agent or chain transfer agent should be included in the emulsion to control the molecular weight and viscosity of the finished polymer. As known by those skilled in the art, increasing amounts of a given modifier lower molecular weight and viscosity. Examples of suitable modifying agents are aliphatic mercaptans having 4 to 18 carbon atoms and dialkyl xanthogen disulfides in which the alkyl groups have 1 to 8 carbon atoms. Polymerization is actually accomplished by means of a redox catalyst, examples of which are potassium persulfate in combination with sodium sulfite, hydrogen peroxide in combination with potassium hydrosulfite, cumene hydroperoxide with sodium formaldehyde sulfoxylate and potassium ferricyanide with sodium sulfite. The catalyst components are added to the system in such a way as to give a controllable polymerization. The polymerization can be conducted at temperatures ranging from about 0° C. to 60° C., but temperatures around 40° C. are preferred. It is preferred that the reaction be allowed to reach a high conversion in order to insure adequate copolymerization of the less reactive acid comonomer. Thus, the conversion should be above about 70% and preferably around 90%. The progress of the polymerization may be followed by the change in specific gravity. When the desired conversion has been reached the polymerization may be stopped by the addition of substances such as phenothiazine, p-tertiary-butyl-pyrocatechol and ditertiary-butyl hydroquinone.

An alternative method is to form an emulsion containing all of the methacrylic acid and only part of the chloroprene and gradually to add an emulsion containing the remainder of the chloroprene to the system during the course of the polymerization. Optionally, sulfur or sulfur dioxide may be present during the polymerization to incorporate polysulfide or sulfonyl linkages into the copolymer.

Polymer may be isolated directly from the polymerization mass by removing unreacted chloroprene by steam-stripping as disclosed in U.S. Patent 2,467,769, for example, followed by freeze coagulation as disclosed in U.S. Patent 2,187,146. It is preferable, however, to adjust the hydrogen ion concentration in the latex to a pH of 8 or above with a base, such as dilute sodium hydroxide or ammonium hydroxide before steam-stripping and freeze coagulation. This adjustment of pH prior to these operations minimizes the amount of coagulum formed during the isolation. For this adjustment a 2% solution of sodium hydroxide is especially preferred. Copolymers isolated without pH adjustment are believed to contain free carboxyl groups introduced by the methacrylic acid. The carboxyl groups of copolymers isolated following pH adjustment with a base are believed to exist partially in the form of their salts. While sodium salts are preferred, the carboxyl groups in the copolymer may be in the form of a salt formed with any monovalent cation.

Copolymers produced by this procedure or related procedures which contain about 0.02 to 0.7 weight percent carboxyl groups, calculated on the assumption that the carboxyl groups are in the acid form, may be used directly in preparing the solvent cements of this invention. The preferred concentration of carboxyl groups is from about 0.1 to 0.4 weight percent.

Copolymers containing up to about 2.0% carboxyl groups can be used to prepare the compositions of this invention if they are blended with conventional chloroprene polymers to form mixtures containing from about 0.02 to 0.7% by weight of carboxyl groups based on the total weight of polymer. Such blends exhibit similar properties to the unblended copolymers when used in solvent cements, especially if the major component in the blend is carboxyl group-containing coplymer. The blends required for preparing the compositions of the present invention may be made by mixing solid coplymers with a conventional chloroprene polymer on standard rubber mills or in internal mixers. The blends may also be prepared by dissolving both the copolymer and conventional chloroprene polymer in a suitable solvent, or they may be dissolved separately and mixed as solutions subsequently. It is even possible to prepare an unblended copolymer cement composition of the present invention and to mix this with a conventional cement composition differing only in the chloroprene polymer employed, so as to produce a composition containing a blend of copolymer and conventioal polymer within the limits of this invention.

The term "conventional chloroprene polymers" covers homopolymers of chloroprene and carboxyl group-free copolymers of chloroprene with up to about 20% of another ethylenically unsaturated monomer copolymerizable therewith, such as 2,3-dichlorobutadiene-1,3.

The chloroprene/methacrylic acid copolymers used in the adhesive compositions of this invention are normally compounded with a mixture of zinc oxide and magnesium oxide, or with other alkaline agents such as alkaline magnesium salts, alkaline zinc salts, and mixtures thereof. Generally, a mixture of standard rubber grades of zinc oxide and extra light calcined magnesium oxide (XLC magnesia) is used. The zinc oxide is ordinarily added in the amount of about 5 parts per 100 parts of coplymer and prior to the discovery of this invention it was found that the use of 8-10 parts of XLC magnesia per 100 parts of copolymer gave the best attainable adhesive properties.

As stated above, the heart of this invention is the unexpected discovery that inclusion of small proportions of salicylic acid makes it possible to reduce substantially or even to eliminate entirely the magnesia from adhesive cements based on chloroprene/methacrylic acid copolymers, and that adhesive bonds formed from such compositions have greatly enhanced strength at elevated temperature. In the language of practical adhesive compounders, they have improved "hot bond strength." This desirable effect is obtained by including in the composition from 2 to 10 parts of salicylic acid, either pure or in the form of the proprietary composition known as Retarder W, which is a preparation of about 90% salicylic acid with about 10% of inert compounding aids. With the inclusion of salicylic acid in the manner described, it has been found that excellent adhesion is achieved when only 2 to 4 parts of magnesia per hundred parts of copolymer are added, and even when the magnesia is entirely eliminated, satisfactory results are obtained.

The heat-reactive phenolic resins are preferred for preparing the novel adhesives of this invention. This class of oil-soluble phenolic resins may be prepared by reacting 1 mole of a para-substituted phenol with about 1–2 moles of formaldehyde in the presence of an alkaline condensation catalyst. Phenols substituted in the para-position with alkyl groups having 3 to 8 carbon atoms are useful for preparing these resins. Examples of such phenols include p-isopropyl phenol, p-tertiary-butyl phenol, p-cyclohexyl phenol, p-tertiary-amyl phenol and p-octyl phenol. Resins derived from p-tertiary-butyl phenol are especially preferred and are readily available. Typical commercial products of this class are "Bakelite" Resins "CKR–1634" and "CKR–1734." Zinc rosinate preparations such as "Zirex" and "Zinar," supplied by the Heyden-Newport Company, may also be used.

Any of the solvents or solvent mixtures commonly used in preparing conventional chloroprene solvent adhesives may be used in preparing the compositions of the present invention. Aromatic hydrocarbons such as toluene, chlorinated hydrocarbons such as chloroform, certain ketones such as methyl ethyl ketone, and esters such as ethyl acetate are good solvents used either alone or in combination with other solvents. Blends of solvents containing aliphatic hydrocarbons, in which chloroprene polymers are not soluble alone, are widely used in these adhesives. Multi-component solvent mixtures also find use in preparing the compositions of the present invention.

The following are examples of useful solvent combinations with composition indicated in parts by volume: toluene/hexane/ethyl acetate (1:1:1); toluene/hexane/ethyl acetate/trichloroethylene (3:3:3:1); acetone/heptane (3:7); toluene/ethyl acetate (2:8); toluene/hexane/methyl ethyl ketone (1:1:1).

In order to insure the excellent aging properties associated with chloroprene polymers, it is desirable to include an antioxidant in the present compositions. Any antioxidant employed in conventional chloroprene polymer adhesives may be incorporated. About 2 parts of antioxidant per 100 parts of copolymer is usually adequate. If discoloration is no problem, N-phenyl-beta-naphthylamine is preferred. If a non-staining, non-discoloring antioxidant is required, a variety of alkylated phenol type antioxidants may be used.

Preparation of the solvent adhesive compositions of this invention may be accomplished by the procedures employed for the manufacture of conventional chloroprene polymer cements. The most common procedure is to mill-mix the chloroprene polymers with compounding ingredients, less the phenolic resin, and to mix the resulting compound and resin with solvent in a cement churn or other suitable mixer to form a polymer solution having the insoluble components well dispersed therein. The salicylic acid is also added to the compounded chloroprene copolymer with the phenolic resin in the cement churn. This technique is satisfactory with the chloroprene copolymers required in this invention, but milling should be kept to a minimum, for the compounded copolymers tend to scorch more readily than do conventional adhesive grades of chloroprene polymers. As indicated, the oil-soluble phenolic resins are generally added directly into the churn rather than being mill-mixed into the copolymer. When cements containing magnesium-modified resins of the heat-reactive type are prepared, the unmodified resin may be added to the cement churn along with sufficient magnesium oxide for modification. The magnesium oxide, when employed, may be in the form of dry powder or compounded in the copolymer. Alternatively, the resin and magnesium oxide can be reacted separately in a portion of the solvent to be used in the final cement and added as a solution to the cement churn where blending with the copolymer and other ingredients is accomplished. Normally the resin is not included with the ingredients for a mill-mixed compound.

The following examples, in which an adhesive cement composition is prepared according to the above-described general procedure, illustrate more particularly the use of salicylic acid in improved adhesive compositions based on chloroprene/methacrylic acid copolymers. Ingredients are given in parts by weight. Test specimens to be adhered together are prepared by Method A, page 10, of the publication, "Neoprene Solvent Adhesives," referred to above, and are tested by conventional procedures. The chloroprene/methacrylic acid copolymer employed contains about 0.2% carboxyl groups. Throughout these examples the "Bond Strengths" are given in pounds per linear inch of width, "Aging Time" is the time the test specimens are allowed to set at 24° C., and the "Conditioning Time" is the time the specimens are retained at the test temperature.

*Example 1*

The improvement in hot bond strength conferred by salicylic acid with a normal amount (8 parts) of magnesia on an adhesive based on a chloroprene/methacrylic acid copolymer is illustrated as follows:

A. PREPARATION OF COMPOUNDED CHLOROPRENE COPOLYMER STOCK

The following compounds are compounded together through means of a mill-mixing process.

| Component: | Parts |
|---|---|
| Chloroprene/methacrylic acid copolymer | 100 |
| Magnesia | 4 |
| Phenyl alpha-naphthyl amine | 2 |
| Zinc oxide | 5 |

B. PREPARATION OF ADHESIVE COMPOSITION

Six separate adhesive composition samples (1–6) are prepared. Each of the samples contains the following ingredients:

| Component: | Parts |
|---|---|
| Stock of part A | 111 |
| Magnesia | 4 |
| Water | 1 |
| Toluene/hexane/ethyl acetate (1:1:1) | 480 |
| "CKR-1634" resin | [1] 40 |
| "Zirex" (zinc rosinate) | [2] 40 |

[1] To samples 1–3.
[2] To samples 4–6.

In addition, 1.8 parts of salicylic acid are added to samples 2 and 5, and 4.5 parts to samples 3 and 6.

C. ADHESIVE COMPOSITIONS BOND STRENGTHS

The adhesiveness of the above six compositions is determined by measuring the force required to peel apart, at two inches per minue, two one inch strips of canvas which have been bonded with the adhesive compositions of part (B). Results are as follows:

| Test Temperature | Aging Time, Days | Conditioning Time, Minutes | Bond Strength [1] of Sample No.— | | | | | |
|---|---|---|---|---|---|---|---|---|
| | | | 1 | 2 | 3 | 4 | 5 | 6 |
| 100° C | 3 | 7 | 10 | 10 | 13 | 4.3 | 11.5 | 10.5 |
| 100° C | 7 | 10 | 12.5 | 16.3 | 19.5 | 6.8 | 13 | 16 |
| 121° C | 7 | 10 | 7 | 10 | 11 | 8 | 7.5 | 10 |
| 149° C | 7 | 10 | 6 | 7.5 | 11.5 | 3 | 4 | 6 |
| 177° C | 7 | 10 | 3.5 | 4 | 7 | 2 | | 3 |
| 204° C | 7 | 10 | 1.5 | | 2.5 | | | |

[1] Canvas to Canvas—180° Peel—Bonded Tacky.

*Example 2*

The improvement in hot bond strength conferred by salicylic acid with 4 parts of magnesia is illustrated as follows:

A. PREPARATION OF COMPOUNDED COPOLYMER STOCK

The chloroprene/methacrylic acid copolymer is compounded exactly as in part A of Example 1.

B. PREPARATION OF ADHESIVE COMPOSITIONS

Three separate adhesive composition samples (1–3) are prepared. Each sample contains the following ingredients.

| Component: | Parts |
|---|---|
| Stock of Part A | 111 |
| "CKR-1634" resin | 40 |
| Toluene/hexane/ethyl acetate (1:1:1) | 480 |
| Water | 1 |

In addition 4.5 parts of salicylic acid are added to sample 2, and 9 parts to sample 3.

C. ADHESIVE COMPOSITION BOND STRENGTHS

The adhesive strength of the three samples is tested in the same manner as in part C of Example 1. Results are as follows:

| Test Temp. | Aging Time, days | Conditioning Time, minutes | Bond Strength [1] of Sample No.— | | |
|---|---|---|---|---|---|
| | | | 1 | 2 | 3 |
| 100° C | 3 | 7 | 5 | 10.8 | 9.5 |
| 100° C | 7 | 7 | 8 | 13.5 | 12.5 |
| 100° C | 7 | 14 | 9.5 | 16 | 17 |

[1] Canvas to Canvas—180° Peel.

*Example 3*

The improvement in hot bond strength conferred by salicylic acid with 2 parts of magnesia is illustrated as follows:

A. PREPARATION OF COMPOUNDED CHLOROPRENE COPOLYMER STOCK

The following components are compounded together by a mill-mixing process.

| Component: | Parts |
|---|---|
| Chloroprene copolymer | 100 |
| Magnesia | 2 |
| Phenyl alpha-naphthyl amine | 2 |
| Zinc oxide | 5 |

B. PREPARATION OF ADHESIVE COMPOSITIONS

Two adhesive composition samples (1–2) are prepared. Each sample contains the following ingredients:

| Component: | Parts |
|---|---|
| Stock fromt Part A | 109 |
| "CKR-1634" resin | 40 |
| Water | 1 |
| Toluene/hexane/ethyl acetate (1:1:1) | 480 |

In addition 4.5 parts of salicylic acid are added to sample 2.

C. ADHESIVE COMPOSITION BOND STRENGTHS

The adhesive strength of the two samples is tested in the same manner as in part C of Example 1. Results are as follows:

| Test Temperature | Aging Time, Days | Conditioning Time, Minutes | Bond Strength [1] of Sample No.— | |
|---|---|---|---|---|
| | | | 1 | 2 |
| 100° C | 3 | 10 | 3.5 | 11.0 |
| 100° C | 7 | 10 | 5.0 | 15.0 |

[1] Canvas to Canvas—180° Peel.

Example 4

The improvement in hot bond strength between canvas and various other materials that results from addition of salicylic acid is illustrated as follows:

A. PREPARATION OF COMPOUNDED CHLOROPRENE COPOLYMER STOCK

The following components are compounded together through means of a mill-mixing process.

| Component: | Parts |
|---|---|
| Chloroprene/methacrylic acid copolymer | 100 |
| Magnesia | 4 |
| Phenyl alpha-naphthyl amine | 2 |
| Zinc oxide | 5 |

B. PREPARATION OF ADHESIVE COMPOSITION

Two samples of the adhesive composition are prepared. Each sample contains the following ingredients:

| Component: | Parts |
|---|---|
| Stock from part A | 111 |
| "CKR-1634" resin | 40 |
| Magnesia | 4 |
| Toluene/hexane/ethyl acetate (1:1:1:) | 480 |
| Water | 1 |

In addition, 4.5 parts of salicylic acid are added to sample 2.

C. ADHESIVE COMPOSITION BOND STRENGTHS

The bond strength of the two samples is measured by determining the force required to peel apart a strip of canvas which has been adhered by the samples to the following materials:

| Material | Sample 1 (Control) | Sample 2 (4.5 parts Salicylic Acid) |
|---|---|---|
| Canvas | 18 | 22 |
| Aluminum | 16 | 22 |
| Wood (Maple) | 15 | 16 |
| Stainless Steel | 15 | 20 |
| Carbon Steel (Sand-Blasted) | 14 | 16 |

Example 5

The use of salicylic acid to eliminate entirely the need for magnesia in the formulation is illustrated as follows:

A. PREPARATION OF COMPOUNDED CHLOROPRENE COPOLYMER STOCK

The chloroprene copolymer stock is prepared in the same manner as in Example 1 except no magnesia is added.

B. PREPARATION OF ADHESIVE COMPOSITION

Three samples (1–3) of adhesive composition are prepared. Each of the samples contains the following ingredients:

| Component: | Parts |
|---|---|
| Stock from Part A | 107 |
| "CKR-1634" resin | 40 |
| Toluene/hexane/ethyl acetate (1:1:1) | 480 |
| Water | 1 |

In addition 8 parts of magnesia are added to sample 1, and 4.5 parts of salicylic acid are added to sample 3.

C. ADHESIVE COMPOSITION BOND STRENGTHS

The bond strengths of the three samples are measured by the force required to separate two strips of canvas adhered together by the compositions as in Example 1. Results are as follows:

Bond Strengths

| Sample 1 | 12.3 |
|---|---|
| Sample 2 | (1) |
| Sample 3 | 12.5 |

[1] Does not form a solution; cannot be tested.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In an adhesive composition comprising (a) a chloroprene/methacrylic acid copolymer containing from about 0.02 to 0.7% by weight carboxylic acid groups, (b) a tackifier selected from the group consisting of phenolic resins, zinc and calcium rosinates, (c) an antioxidant (d) zinc oxide (e) about 0 to 4 parts of magnesium oxide, and (f) a liquid component serving as a solvent for components (a) through (c) and a medium in which insoluble components (d) and (e) may be finely dispersed; the improvement of incorporating into said composition about 2–10 parts of salicylic acid per 100 parts of said chloroprene/methacrylic acid polymer.

2. In an adhesive composition comprising in parts by weight: (a) about 100 parts of chloroprene/methacrylic acid copolymer having from about 0.1 to 0.4% by weight carboxylic acid groups, (b) about 40 parts of a phenol/formaldehyde resin, (c) about 2 parts of phenyl-alpha-naphthyl-amine (d) about 5 parts zinc oxide (e) about 0 to 4 parts magnesium oxide and (f) about 480 parts of a liquid component consisting essentially of an equal volume mixture of toluene, hexane, and ethyl acetate; the improvement of incorporating into said composition about 2–10 parts of salicylic acid per 100 parts of said chloroprene/methacrylic acid copolymer.

3. A new adhesive composition suitable for use at elevated temperatures comprising in parts by weight (a) about 100 parts of chloroprene/methacrylic acid copolymer containing from about 0.02 to 0.7% by weight carboxylic acid groups (b) about 40 parts of a tackifier selected from the group consisting of phenol/formaldehyde resins, zinc rosinates, and calcium rosinates (c) about 2 parts of an antioxidant selected from the group consisting of phenyl-naphthylamines and alkylated phenols, (d) about 5 parts of zinc oxide (e) about 0 to 4 parts of magnesium oxide, (f) about 2–10 parts of salicylic acid and (g) about 480 parts of a liquid component selected from the group consisting of aromatic hydrocarbons, aliphatic hydrocarbons, chlorinated aliphatic hydrocarbons, ketones and esters.

4. The adhesive composition of claim 3 wherein the tackifier (b) is a phenol/formaldehyde resin, the antioxidant (c) is N-phenyl-beta-naphthylamine and the liquid component (g) is an equal volume mixture of toluene, hexane, and ethyl acetate.

References Cited

UNITED STATES PATENTS 3,185,658   5/1965   Garrett _____ 260—31.2 XR

FOREIGN PATENTS 251,137   3/1963   Australia.

OTHER REFERENCES

Chemical Abstracts; Vol. 62; col. 1832; January 1965; "Chloroprene Rubber Mixture With Higher Resistance Against Prevulcanization"; Section *e*; Smely et al.

MORRIS LIEBMAN, *Primary Examiner.*

L. T. JACOBS, *Assistant Examiner.*